(12) United States Patent   (10) Patent No.: US 8,779,732 B2
Inoue   (45) Date of Patent: Jul. 15, 2014

(54) STEP-UP CIRCUIT HAVING REFERENCE VOLTAGE GENERATOR TO CONTROL VOLTAGE INCREASE IN ACCORDANCE WITH SUPPLY VOLTAGE

(71) Applicant: Fumihiro Inoue, Tokyo (JP)

(72) Inventor: Fumihiro Inoue, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 13/772,583

(22) Filed: Feb. 21, 2013

(65) Prior Publication Data

US 2013/0265027 A1    Oct. 10, 2013

(30) Foreign Application Priority Data

Apr. 5, 2012  (JP) ................. 2012-086885

(51) Int. Cl.
*G05F 1/00* (2006.01)
*G05F 1/613* (2006.01)

(52) U.S. Cl.
USPC .......................... 323/222; 323/223

(58) Field of Classification Search
USPC .................. 323/222, 223, 224, 225
See application file for complete search history.

(56) References Cited

U.S. PATENT DOCUMENTS

| | | | |
|---|---|---|---|
| 5,748,032 A * | 5/1998 | Baek | 327/536 |
| 6,141,262 A * | 10/2000 | Sudo | 365/189.09 |
| 6,262,592 B1 * | 7/2001 | Kim | 326/32 |
| 7,372,319 B1 * | 5/2008 | Lee | 327/536 |
| 7,994,843 B2 | 8/2011 | Ogawa | |
| 2006/0055462 A1 * | 3/2006 | Inagaki | 330/279 |
| 2009/0224823 A1 * | 9/2009 | Gyohten et al. | 327/538 |

FOREIGN PATENT DOCUMENTS

JP   2010-239609   10/2010

* cited by examiner

*Primary Examiner* — Adolf Berhane
*Assistant Examiner* — Emily P Pham
(74) *Attorney, Agent, or Firm* — IPUSA, PLLC

(57) ABSTRACT

A step-up circuit includes a capacitor, a transistor connected to the capacitor, and a reference voltage generator circuit configured to supply the transistor with a reference voltage that causes a rate of voltage increase relative to supply voltage to vary in accordance with the supply voltage.

6 Claims, 15 Drawing Sheets

FIG.10
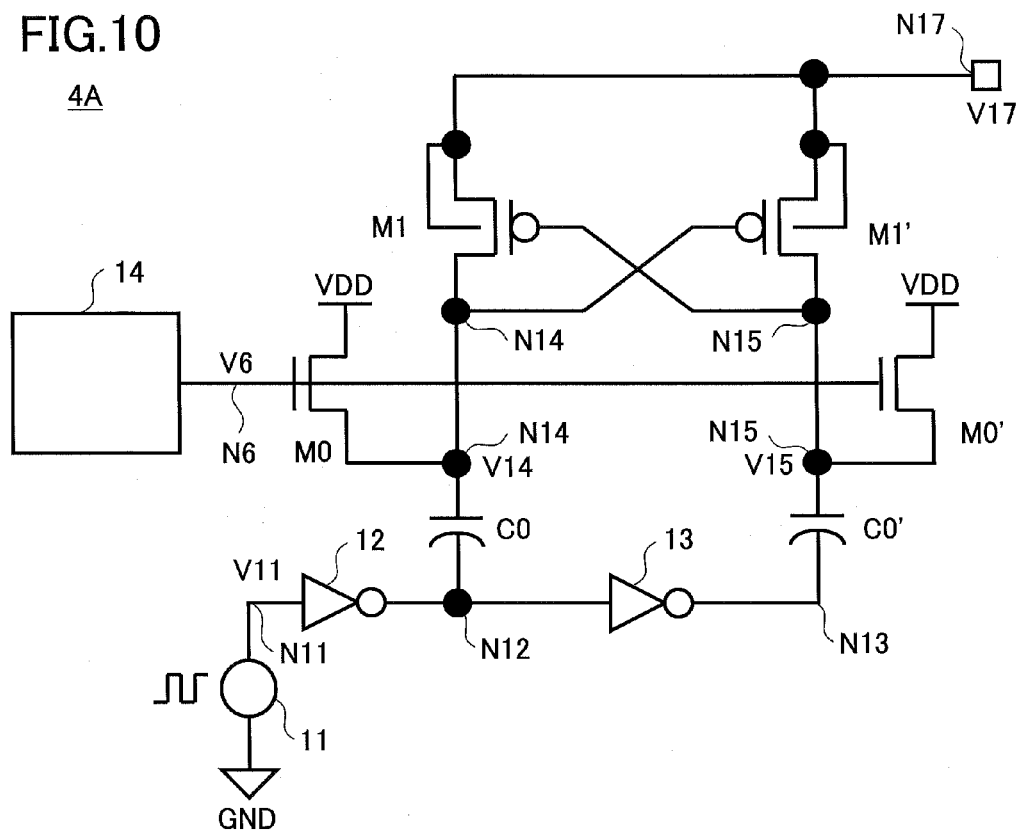
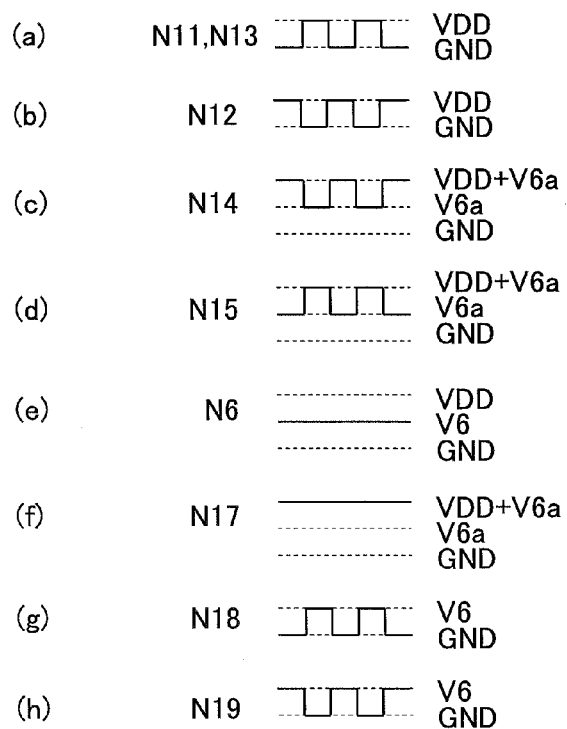
FIG.11

US 8,779,732 B2

STEP-UP CIRCUIT HAVING REFERENCE VOLTAGE GENERATOR TO CONTROL VOLTAGE INCREASE IN ACCORDANCE WITH SUPPLY VOLTAGE

CROSS-REFERENCE TO RELATED APPLICATION

This application is based upon and claims the benefit of priority of Japanese Patent Application No. 2012-086885, filed on Apr. 5, 2012, the entire contents of which are incorporated herein by reference.

BACKGROUND OF THE INVENTION

1. Field of the Invention

The present invention relates to a step-up circuit that includes a capacitor for increasing voltage.

2. Description of the Related Art

Japanese Laid-Open Patent Application No. 2010-239609 discloses a step-up circuit that increases a supply voltage twofold.

SUMMARY OF THE INVENTION

According to an aspect of the present invention, a step-up circuit includes a capacitor; a transistor connected to the capacitor; and a reference voltage generator circuit configured to supply the transistor with a reference voltage that causes a rate of voltage increase relative to a supply voltage to vary in accordance with the supply voltage.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 10 is a diagram illustrating a configuration of a charge pump circuit according to a fourth embodiment;

FIG. 11 is a timing chart illustrating clock timing of the charge pump circuit according to the fourth embodiment;

DETAILED DESCRIPTION OF THE PREFERRED EMBODIMENTS

Figure 1:
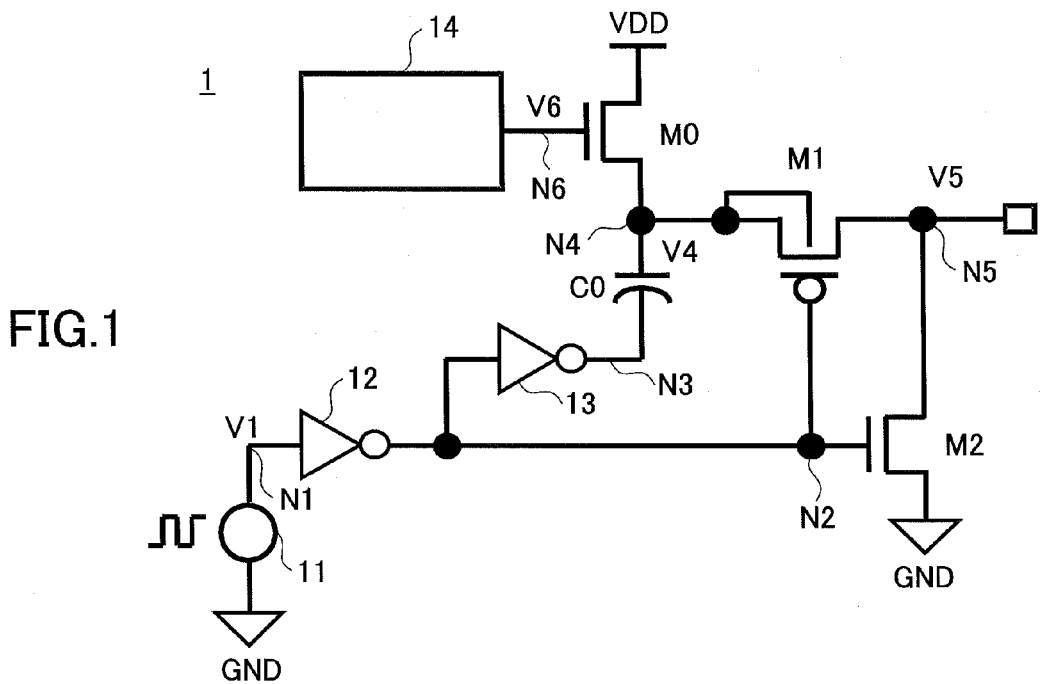
FIG. 1 is a diagram illustrating a configuration of a clock booster circuit according to a first embodiment.

As described above, Japanese Laid-Open Patent Application No. 2010-239609 discloses a step-up circuit that increases a supply voltage twofold. According to this technique, however, when the step-up circuit operates at a supply voltage near the withstand voltage of a semiconductor process, the increased voltage exceeds the withstand voltage. Therefore, the supply voltage range that may be used for the step-up circuit is limited.

According to an aspect of the present invention, a step-up circuit for which a wider supply voltage range may be used is provided.

According to an aspect of the present invention, it is possible to widen a usable supply voltage range.

A description is given below, with reference to the accompanying drawings, of embodiments of the present invention. In the drawings, transistors having gates to which a circuit is affixed represent P-channel MOSFETs (metal-oxide semiconductor field-effect transistors), and transistors having gates to which no circle is affixed represent N-channel MOSFETs.

First Embodiment

FIG. 1 is a diagram of a clock booster circuit 1 according to a first embodiment. The clock booster circuit 1 increases and outputs a voltage V1 of a clock signal of GND-VDD amplitude fed from an oscillator circuit 11. The clock booster circuit 1 includes a sampling capacitor C0, a transistor M0 connected to the sampling capacitor C0, and a reference voltage generator circuit 14. The reference voltage generator circuit 14 supplies the transistor M0 with a reference voltage V6, which causes a rate of voltage increase relative to a supply voltage VDD to vary in accordance with the supply voltage VDD. The clock booster circuit 1 further includes transistors M1 and M2 and inverters 12 and 13 as other circuit elements for increasing the supply voltage VDD.

The reference voltage generator circuit 14 generates the reference voltage V6 for increasing the supply voltage VDD, and supplies the reference voltage V6 to the gate of the transistor M0, which is the control electrode of the transistor M0. The transistor M0 is a switch that is controlled in accordance with the reference voltage V6 supplied from the reference voltage generator circuit 14 to charge the sampling capacitor C0 with electric charge as desired.

The transistor M0 is connected as a source follower to the sampling capacitor C0. The transistor M0 has a drain as a first main electrode and a source as a second main electrode. The drain is connected to the supply voltage VDD. The source is connected to the output side electrode of the sampling capacitor C0 on its one side via a node N4.

Specific examples of the transistor M0 include a depletion-mode NMOS (N-channel MOSFET), a native NMOS, and an enhancement-mode NMOS.

According to this circuit configuration, at a voltage increase time, when a node N3 where the inverter 13 and the sampling capacitor C0 are connected becomes HIGH (high level), the transistor M0 automatically turns OFF.

Figure 2:
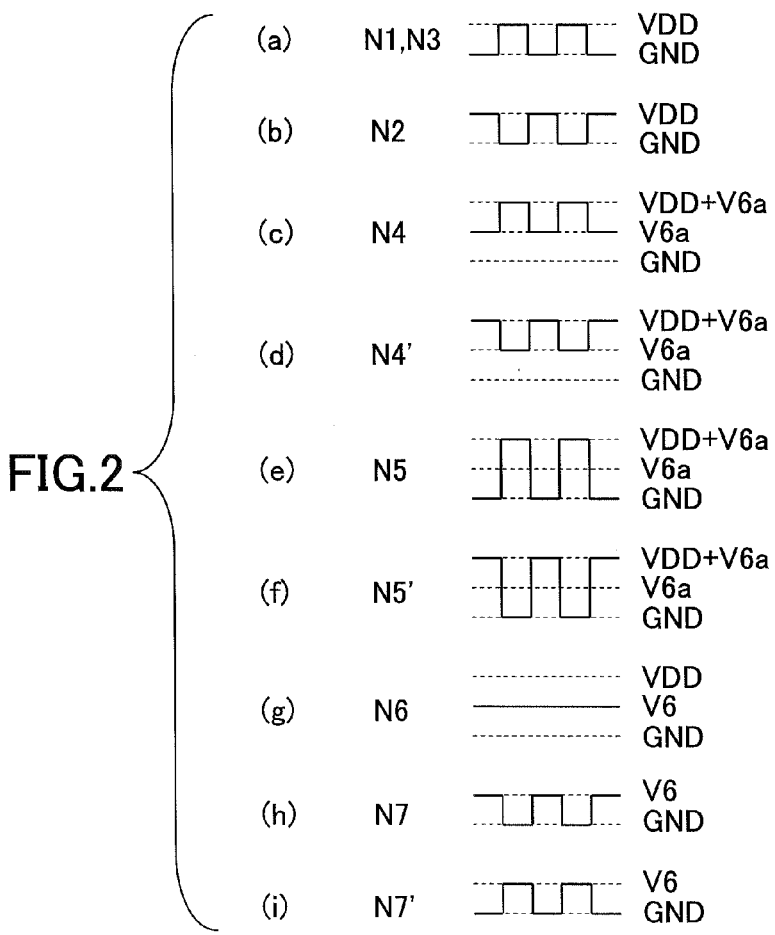
FIG. 2 is a timing chart illustrating clock timing of the clock booster circuit according to the first embodiment.

The clock booster circuit 1 operates in accordance with the clock timing illustrated in FIG. 2. When a node N1 and the node N3 are LOW (low level), a voltage V4 of the sampling capacitor C0 increases to a voltage V6a, which depends on the reference voltage V6 supplied from the reference voltage generator circuit 14, and electric charge is stored in the sampling capacitor C0. The voltage V6a is expressed by:

$$V6a = V6 - Vth, \quad (1)$$

where Vth is the gate threshold voltage of the transistor M0.

Meanwhile, when the nodes N1 and N3 are HIGH (high level), the electrode voltage on the clock signal input side of the sampling capacitor C0 is changed from GND (ground) to VDD. Therefore, a voltage (increased voltage) V5 obtained by increasing the supply voltage VDD is output from the drain of the transistor M1 whose source is connected to the node N4 (that is, from a node N5 where the drain of the transistor M1 and the drain of the transistor M2 are connected). The voltage V5 is given by:

$$V5 = VDD + V6a \quad (2)$$
$$= VDD + V6 - Vth.$$

For example, when the transistor M0 is a depletion-mode N-channel MOSFET, letting the gate threshold voltage Vth at normal temperature be −0.6 V, V5 is expressed by:

$$V5 = VDD + V6 + 0.6. \quad (3)$$

When the transistor M0 is a native N-channel MOSFET, letting the gate threshold voltage Vth at normal temperature be 0 V, V5 is expressed by:

$$V5 = VDD + V6. \quad (4)$$

When the transistor M0 is an enhancement-mode N-channel MOSFET, letting the gate threshold voltage Vth at normal temperature be 0.6 V, V5 is expressed by:

$$V5 = VDD + V6 - 0.6. \quad (5)$$

Figure 3:
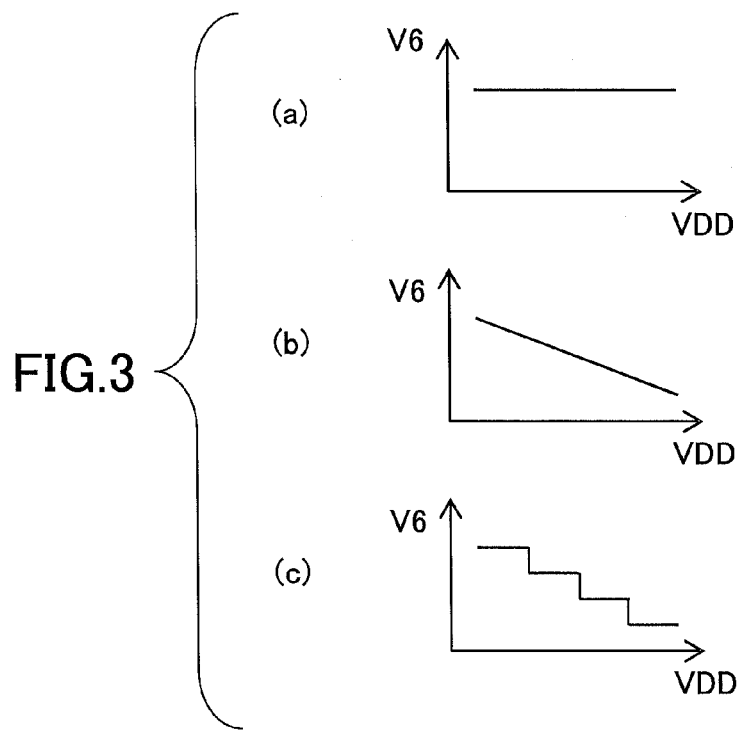
FIG. 3 is a diagram illustrating variations of a reference voltage relative to supply voltage according to the first embodiment.

FIG. 3 is a graph illustrating variations in the reference voltage V6 relative to the power supply voltage VDD. In the following description, the reference voltage V6 of (a) of FIG. 3, which remains constant, may be described as "transitioning" or "varying (with a variation of zero)." The reference voltage generator circuit 14 is configured to vary the voltage increase rate of the voltage V6a (=V6−Vth) of the sampling capacitor C0 in accordance with the supply voltage VDD by causing the reference voltage V6 to vary or transition as illustrated in (a), (b), or (c) of FIG. 3.

In FIG. 3, (a) is the case of causing a constant reference voltage V6 to be generated irrespective of the supply voltage VDD, (b) is the case of causing the reference voltage V6 to linearly decrease as the supply voltage VDD increases, and (c) is the case of causing the reference voltage V6 to decrease stepwise as the supply voltage VDD increases.

For example, the voltage increase rate in the case where the transistor M0 is an enhancement-mode N-channel MOSFET and causes the reference voltage V6 to vary (transition) as illustrated in (a) of FIG. 3 may be calculated as follows. According to Eq. (5) described above, in the case where the reference voltage V6 is 1.6 V when the supply voltage VDD is 2 V, the increased voltage V5 is 3 V. Therefore, the voltage increase rate (=V5/VDD) is 1.5. Further, in the case where the reference voltage V6 remains 1.6 V while the supply voltage VDD increases to 4 V, the increased voltage V5 is 5 V. Therefore, the voltage increase rate decreases to 1.25.

Further, the voltage increase rate in the case where the transistor M0 is an enhancement-mode N-channel MOSFET and causes the reference voltage V6 to vary as illustrated in (b) of FIG. 3 may be calculated as follows. According to Eq. (5) described above, in the case where the reference voltage V6 is 1.6 V when the supply voltage VDD is 2 V, the increased voltage V5 is 3 V. Therefore, the voltage increase rate (=V5/VDD) is 1.5. Further, in the case of reducing the reference voltage V6 to 1.2 V when the supply voltage VDD increases to 4 V, the increased voltage V5 is 4.6 V. Therefore, the voltage increase rate decreases to 1.15.

The same applies to the case of (c) of FIG. 3, and the same applies to the case where the transistor M0 is of a depletion mode or native.

Thus, it is possible to reduce the voltage increase rate as the supply voltage VDD increases and to increase the voltage increase rate as the supply voltage VDD decreases. Therefore, it is possible to widen a usable supply voltage VDD range. For example, in the case of a high supply voltage VDD, it is possible to prevent voltage from increasing beyond the withstand voltage of a process, so that it is possible to avoid a decrease in reliability due to failure. Further, even when the supply voltage VDD is low, it is possible to avoid the increased voltage V5 not rising to a desired value.

Configurations of Reference Voltage Generator Circuit

Figure 4A:
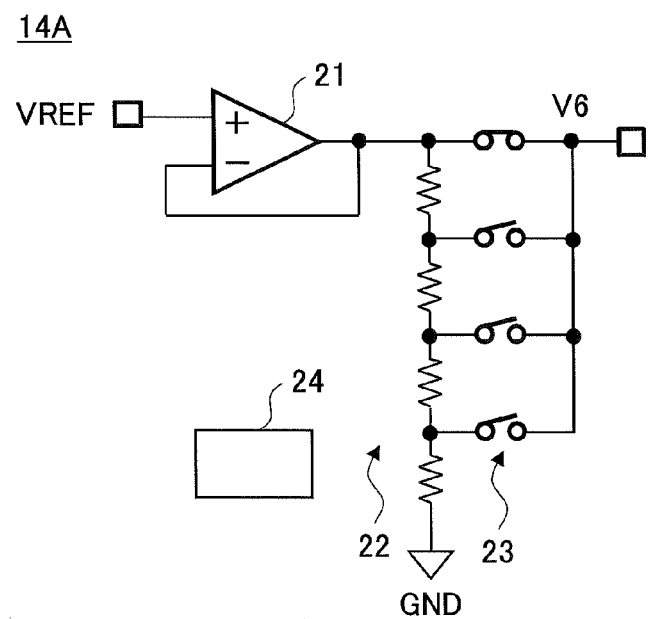
FIG. 4A is a diagram illustrating a configuration of a reference voltage generator circuit according to the first embodiment.
Figure 4B:
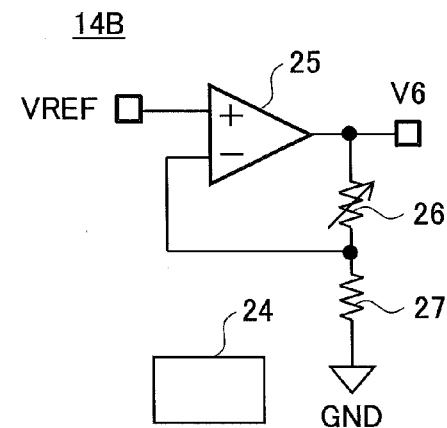
FIG. 4B is a diagram illustrating a configuration of the reference voltage generator circuit according to the first embodiment.
Figure 4C:
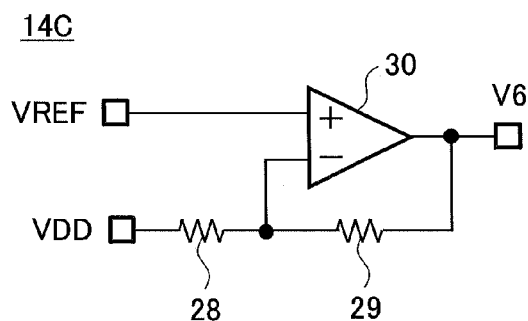
FIG. 4C is a diagram illustrating a configuration of the reference voltage generator circuit according to the first embodiment.

FIG. 4A, FIG. 4B, and FIG. 4C illustrate configurations of the reference voltage generator circuit 14 capable of generating the reference voltage V6 that causes the voltage increase rate to vary in accordance with the supply voltage VDD. According to a reference voltage generator circuit 14A of FIG. 4A, it is possible to generate the reference voltage V6 that varies as illustrated in (a) or (c) of FIG. 3. According to a reference voltage generator circuit 14B of FIG. 4B, it is possible to generate the reference voltage V6 that varies as illustrated in (a) or (c) of FIG. 3. According to a reference voltage generator circuit 14C of FIG. 4C, it is possible to generate the reference voltage V6 that varies as illustrated in (b) of FIG. 3.

The reference voltage generator circuit 14A of FIG. 4A includes a voltage follower 21 that outputs a predetermined voltage VREF, a ladder resistor 22 interposed between the output terminal of the voltage follower 21 and ground, and a switch circuit 23 that selects a point of voltage division by the ladder resistor 22. The reference voltage generator circuit 14A is configured to generate the reference voltage V6 that varies as illustrated in (a) or (c) of FIG. 3 by turning ON and OFF the switch circuit 23 in accordance with the resistor data of a resistor 24, which are stored in correlation with corresponding values of the supply voltage VDD.

The reference voltage generator circuit 14B of FIG. 4B includes an operational amplifier 25 having a non-inverting input terminal to which a voltage VREF is input. The voltage between the output terminal of the operational amplifier 25 and ground is divided by a variable resistor 26 and a fixed resistor 26 to be negatively fed back. The reference voltage generator circuit 14B varies the resistance of the variable resistor 26 in accordance with the resistor data of a resistor 24, which are stored in correlation with corresponding values of the supply voltage VDD. As a result, the gain of the operational amplifier 25 varies in accordance with the supply voltage VDD. Therefore, it is possible to generate the reference voltage V6 that varies as illustrated in (a) or (c) of FIG. 3.

The reference voltage generator circuit 14C of FIG. 4C includes an operational amplifier 30 having a non-inverting input terminal to which a voltage VREF is input. The voltage between the output terminal of the operational amplifier 30 and the supply voltage VDD is divided by a fixed resistor 29 and a fixed resistor 28 to be negatively fed back. The reference voltage generator circuit 14C is configured to generate the reference voltage V6 that varies as illustrated in (b) of FIG. 3 by inverting and amplifying the supply voltage VDD with reference to the voltage VREF.

Second Embodiment

Figure 5:
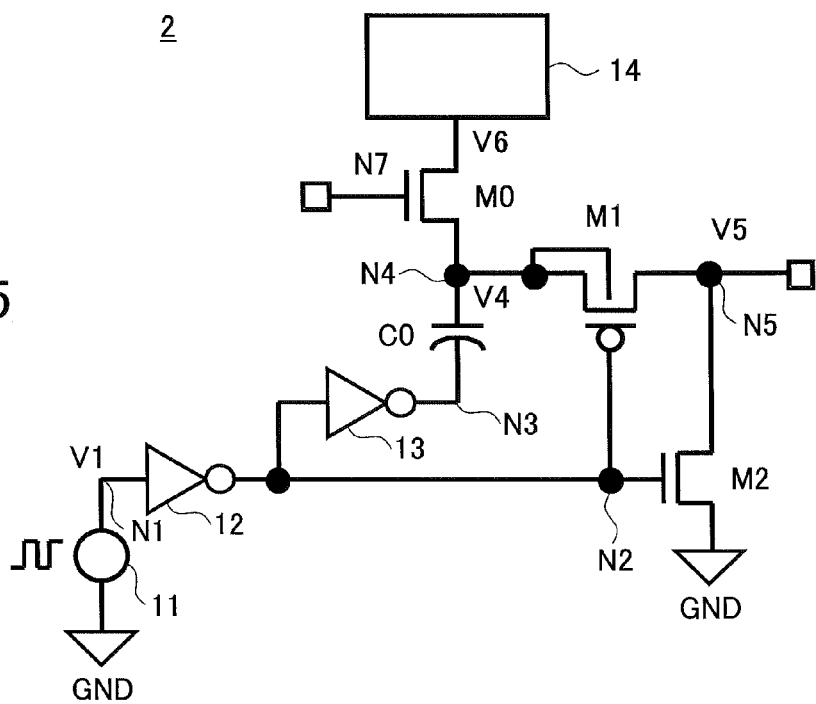
FIG. 5 is a diagram illustrating a configuration of a clock booster circuit according to a second embodiment.

FIG. 5 is a diagram illustrating a configuration of a clock booster circuit 2 according to a second embodiment. A description of the same configuration as that of the above-described embodiment is omitted. The clock booster circuit 2 charges the sampling capacitor C0 with the reference voltage V6. The reference voltage V6 generated by the reference voltage generator circuit 14 is supplied to the drain of the transistor M0. For example, a constant voltage is input to a node N7 to which the gate of the transistor M0 is connected.

Thus, according to this configuration, it is possible to reduce the voltage increase rate as the supply voltage VDD increases and to increase the voltage increase rate as the supply voltage VDD decreases. Therefore, it is possible to widen a usable supply voltage VDD range.

Third Embodiment A

Figure 6:
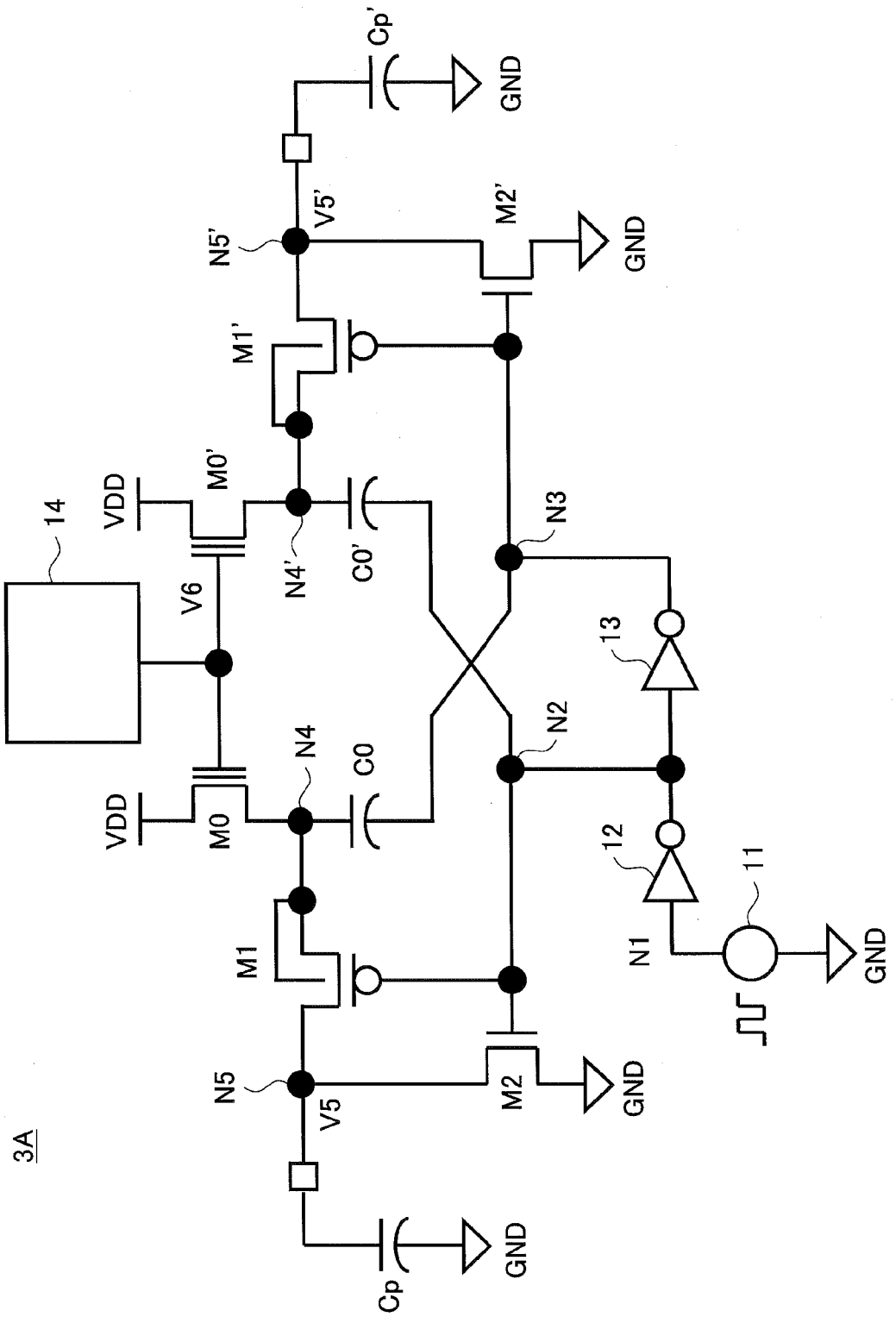
FIG. 6 is a diagram illustrating a configuration of a clock booster circuit according to a third embodiment.

FIG. 6 is a diagram illustrating a configuration of a clock booster circuit 3A according to a third embodiment. A description of the same configuration as those of the above-described embodiments is omitted. The clock booster circuit 3A simultaneously generates increased voltages V5 and V5', which are inverted clock signal voltages relative to each other, from the node N5 and a node N5' to which the drains of the transistor M1 and a transistor M1' are connected, respectively.

The clock booster circuit 3A includes the sampling capacitor C0 and a sampling capacitor C0'; the transistor M0 and a transistor M0' that are connected to the sampling capacitors C0 and C0', respectively, and the reference voltage generator circuit 14. The reference voltage generator circuit 14 supplies the gates of the transistors M0 and M0', which are the control electrodes of the transistors M0 and M0', with the reference voltage V6 that causes the voltage increase rate relative to the supply voltage VDD to vary in accordance with the supply voltage VDD. The clock booster circuit 3A includes the transistors M1, M2 and M1', a transistor M2', the oscillator circuit 11, and the inverters 12 and 13 as other circuit elements for increasing the supply voltage VDD.

The clock booster circuit 3A operates in accordance with the clock timing of FIG. 2.

(A) When the node N1 is LOW (low level), a node N2 is HIGH (high level) and the node N3 is LOW.

(V6−(Vth of M0)) is sampled with reference to GND by the capacitor C0. As a result, the node N4 becomes (V6−(Vth of M0)).

The transistor M1 turns OFF and the transistor M2 turns ON, so that the increased voltage V5 becomes LOW.

The potential of the capacitor C0' is raised with reference to VDD to increase the voltage across the capacitor C0' and the transistor M0' turns OFF. As a result, a node N4' becomes (VDD+(V6−(Vth of M0'))).

The transistor M1' turns ON and the transistor M2' turns OFF, so that the voltage at the node N4' is output to the node N5' (HIGH: (VDD+(V6−(Vth of M0')))).

(B) When the node N1 is HIGH (high level), the node N2 is LOW (low level) and the node N3 is HIGH.

(V6−(Vth of M0')) is sampled with reference to GND by the capacitor C0'. As a result, the node N4' becomes (V6−(Vth of M0')).

The transistor M1' turns OFF and the transistor M2' turns ON, so that the increased voltage V5' becomes LOW.

The potential of the capacitor C0 is raised with reference to VDD to increase the voltage across the capacitor C0 and the transistor M0 turns OFF. As a result, the node N4 becomes (VDD+(V6−(Vth of M0))).

The transistor M1 turns ON and the transistor M2 turns OFF, so that the voltage at the node N4 is output to the node N5 (HIGH: (VDD+(V6−(Vth of M0)))).

By repeating (A) and (B), increased clock signal voltage is output from the nodes N5 and N5' (N5 and N5' are inverted relative to each other).

Third Embodiment B

Figure 7:
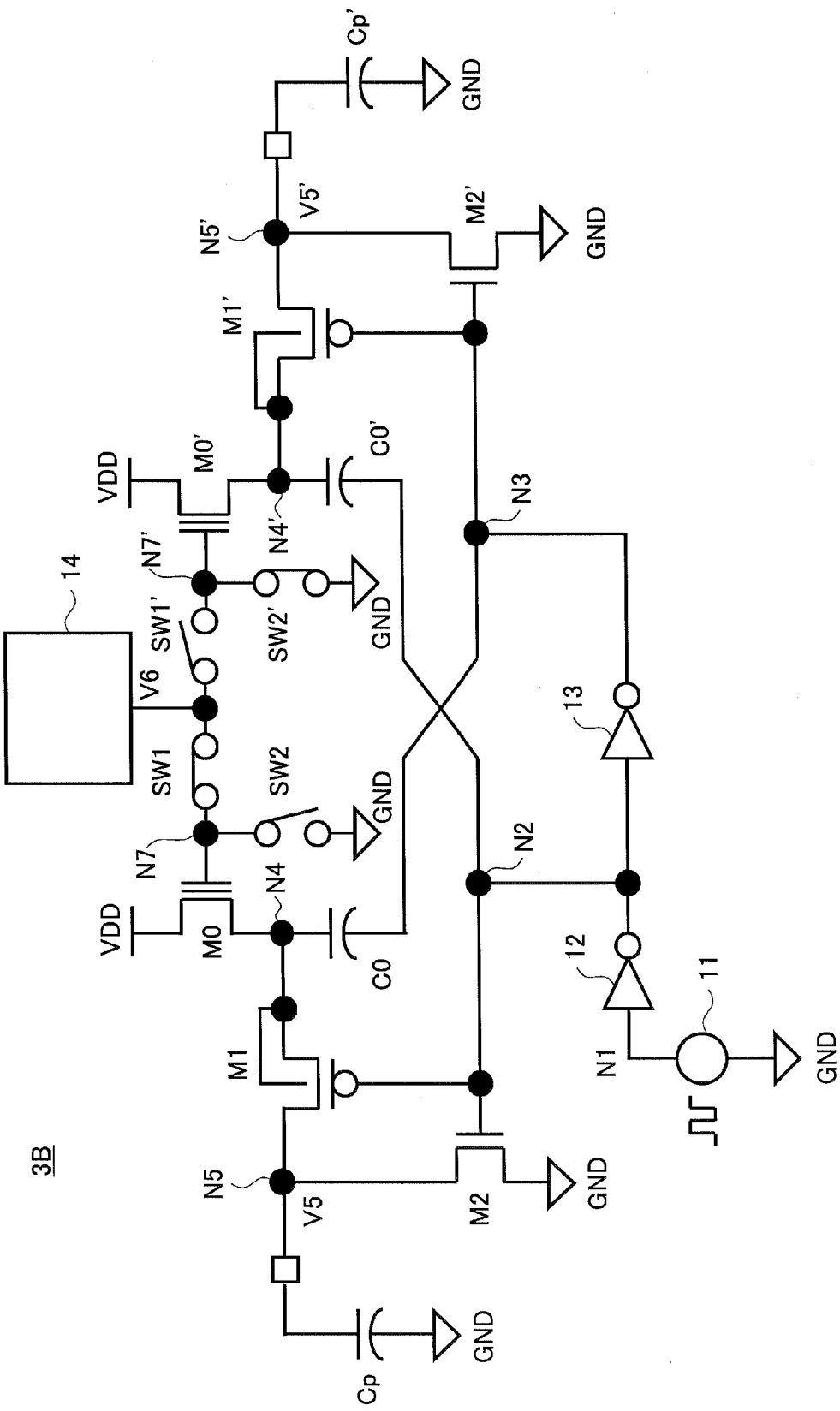
FIG. 7 is a diagram illustrating a configuration of the clock booster circuit according to the third embodiment.

FIG. 7 is a diagram illustrating a clock booster circuit 3B, which is a variation of the clock booster circuit 3A. Referring to FIG. 7, switches SW1, SW2, SW1', and SW2' are added to the clock booster circuit 3A. The switches SW1, SW2, SW1', and SW2' are a switch circuit that selectively switches a control voltage supplied to the gates of the transistors M0 and M0' to the reference voltage V6 or GND. The switches SW1, SW2, SW1', and SW2' turn ON and OFF in synchronization with a clock signal fed from the oscillator circuit 11. The switches SW1, SW2, SW1', and SW2' may be formed of, for example, a MOSFET.

It is preferable to adopt this configuration in the case of using native or depletion-mode N-channel MOSFETs for the transistors M0 and M0' under the condition that the reference voltage V6 is close to VDD potential. That is, when the reference voltage V6 is close to the supply voltage VDD, the gate-source voltage approaches 0 V. Therefore, if the transistors M0 and M0' are native or depletion-mode N-channel MOSFETs, the transistors M0 and M0' may not turn OFF. According to this configuration, it is possible to prevent generation of leakage paths from the nodes N4 and N4' to VDD. Thus, it is possible to avoid falling into a state where increasing voltage is impossible.

The clock booster circuit 3B operates in accordance with the clock timing of FIG. 2.

(A) When the node N1 is LOW (low level), the node N2 is HIGH (high level) and the node N3 is LOW.

When the switch SW1 is ON and the switch SW2 is OFF, the reference voltage V6 is applied to the node N7.

When the switch SW1' is OFF and the switch SW2' is ON, GND is applied to a node N7'.

(V6−(Vth of M0)) is sampled with reference to GND by the capacitor C0. As a result, the node N4 becomes (V6−(Vth of M0)).

The transistor M1 turns OFF and the transistor M2 turns ON, so that the increased voltage V5 becomes LOW.

The potential of the capacitor C0' is raised with reference to VDD to increase the voltage across the capacitor C0' and the transistor M0' turns OFF. As a result, the node N4' becomes (VDD+(V6−(Vth of M0'))). Because the gate potential of the transistor M0' is GND, the gate-source voltage Vgs of the transistor M0' is at or below −VDD. Therefore, even when a native or depletion-mode N-channel MOSFET is used for the transistor M0', no leak current is generated.

The transistor M1' turns ON and the transistor M2' turns OFF, so that the voltage at the node N4' is output to the node N5' (HIGH: (VDD+(V6−(Vth of M0')))).

(B) When the node N1 is HIGH (high level), the node N2 is LOW (low level) and the node N3 is HIGH.

When the switch SW1 is OFF and the switch SW2 is ON, GND is applied to the node N7.

When the switch SW1' is ON and the switch SW2' is OFF, the reference voltage V6 is applied to the node N7'.

(V6−(Vth of M0')) is sampled with reference to GND by the capacitor C0'. As a result, the node N4' becomes (V6−(Vth of M0')).

The transistor M1' turns OFF and the transistor M2' turns ON, so that the increased voltage V5' becomes LOW.

The potential of the capacitor C0 is raised with reference to VDD to increase the voltage across the capacitor C0 and the transistor M0 turns OFF. As a result, the node N4 becomes (VDD+(V6−(Vth of M0))). Because the gate potential of the transistor M0 is GND, the gate-source voltage Vgs of the transistor M0 is at or below−VDD. Therefore, even when a native or depletion-mode N-channel MOSFET is used for the transistor M0, no leak current is generated.

The transistor M1 turns ON and the transistor M2 turns OFF, so that the voltage at the node N4 is output to the node N5 (HIGH: (VDD+(V6−(Vth of M0)))).

By repeating (A) and (B), increased clock signal voltage is output from the nodes N5 and N5' (N5 and N5' are inverted relative to each other).

Third Embodiment C

Figure 8:
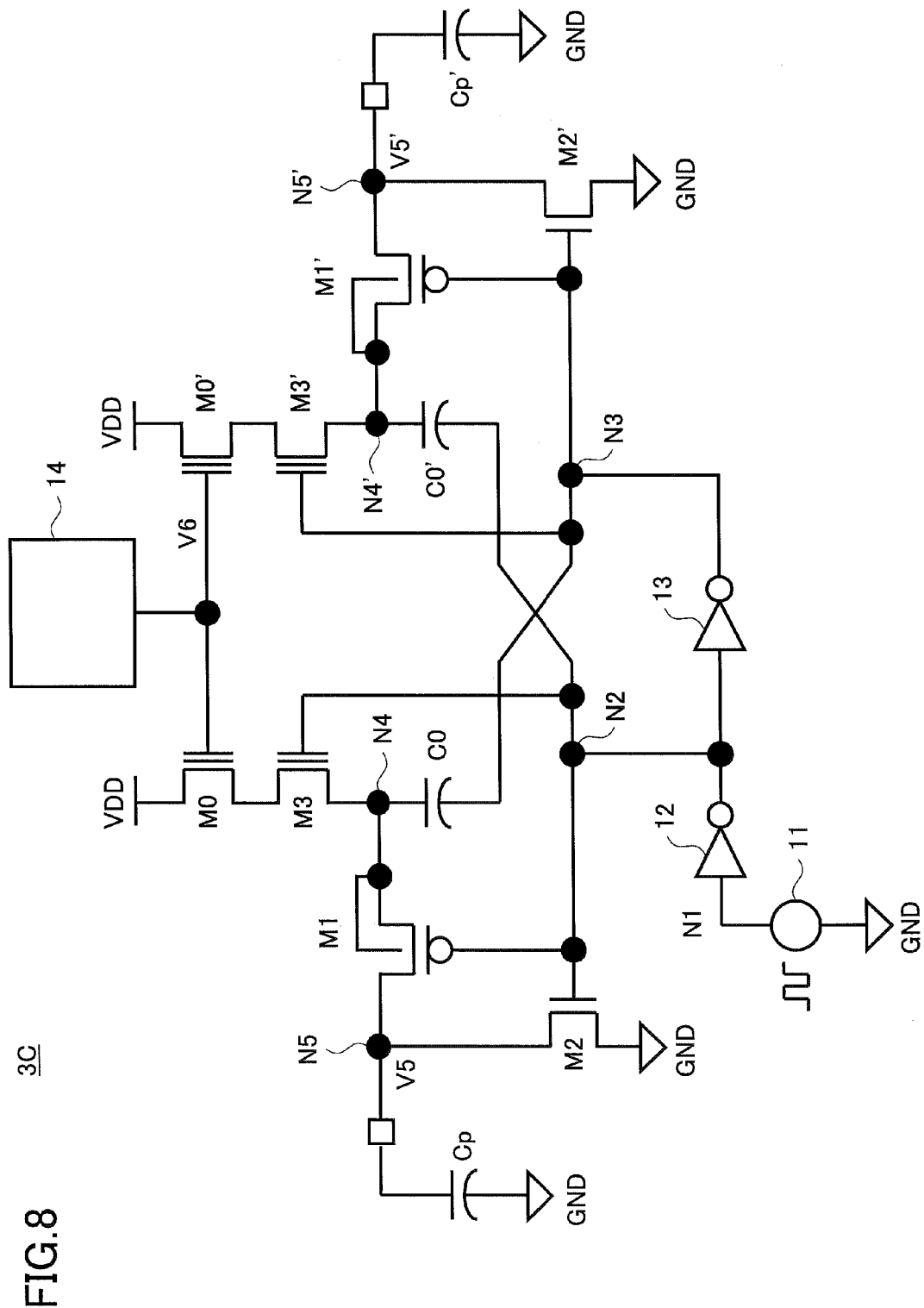
FIG. 8 is a diagram illustrating a configuration of the clock booster circuit according to the third embodiment.

FIG. 8 is a diagram illustrating a clock booster circuit 3C, which is a variation of the clock booster circuit 3A. Referring to FIG. 8, transistors M3 and M3' are added to the clock booster circuit 3A. The clock booster circuit 3C includes the sampling capacitors C0 and C0', the transistors M0 and M0' that are connected to the sampling capacitors C0 and C0' via the transistors M3 and M3', respectively, and the reference voltage generator circuit 14.

The transistor M3 includes a gate connected to the node N2, which is connected to the gates of the transistors M1 and M2, a drain connected to the source of the transistor M0, and a source connected to the node N4. The transistor M3' includes a gate connected to the node N3, which is connected to the gates of the transistors M1' and M2', a drain connected to the source of the transistor M0', and a source connected to the node N4'. The clock booster circuit 3C operates in accordance with the clock timing of FIG. 2.

(A) When the node N1 is LOW (low level), the node N2 is HIGH (high level) and the node N3 is LOW.

The transistor M3 turns ON, so that a current path from VDD to the transistor M0 and the capacitor C0 is generated.

(V6−(Vth of M0)) is sampled with reference to GND by the capacitor C0. As a result, the node N4 becomes (V6−(Vth of M0)).

The transistor M1 turns OFF and the transistor M2 turns ON, so that the increased voltage V5 becomes LOW.

The potential of the capacitor C0' is raised with reference to VDD to increase the voltage across the capacitor C0' and the transistor M0' turns OFF. As a result, the node N4' becomes (VDD+(V6−(Vth of M0'))). Because the transistor M3' is OFF, even when a native or depletion-mode N-channel MOSFET is used for the transistor M0', no leak current to VDD is generated.

The transistor M1' turns ON and the transistor M2' turns OFF, so that the voltage at the node N4' is output to the node N5' (HIGH: (VDD+(V6−(Vth of M0')))).

(B) When the node N1 is HIGH (high level), the node N2 is LOW (low level) and the node N3 is HIGH.

The transistor M3' turns ON, so that a current path from VDD to the transistor M0' and the capacitor C0' is generated.

(V6−(Vth of M0')) is sampled with reference to GND by the capacitor C0'. As a result, the node N4' becomes (V6−(Vth of M0')).

The transistor M1' turns OFF and the transistor M2' turns ON, so that the increased voltage V5' becomes LOW.

The potential of the capacitor C0 is raised with reference to VDD to increase the voltage across the capacitor C0 and the transistor M0 turns OFF. As a result, the node N4 becomes (VDD+(V6−(Vth of M0))). Because the transistor M3 is OFF, even when a native or depletion-mode N-channel MOSFET is used for the transistor M0, no leak current to VDD is generated.

The transistor M1 turns ON and the transistor M2 turns OFF, so that the voltage at the node N4 is output to the node N5 (HIGH: (VDD+(V6−(Vth of M0)))).

By repeating (A) and (B), increased clock signal voltage is output from the nodes N5 and N5' (N5 and N5' are inverted relative to each other).

Third Embodiment D

Figure 9:
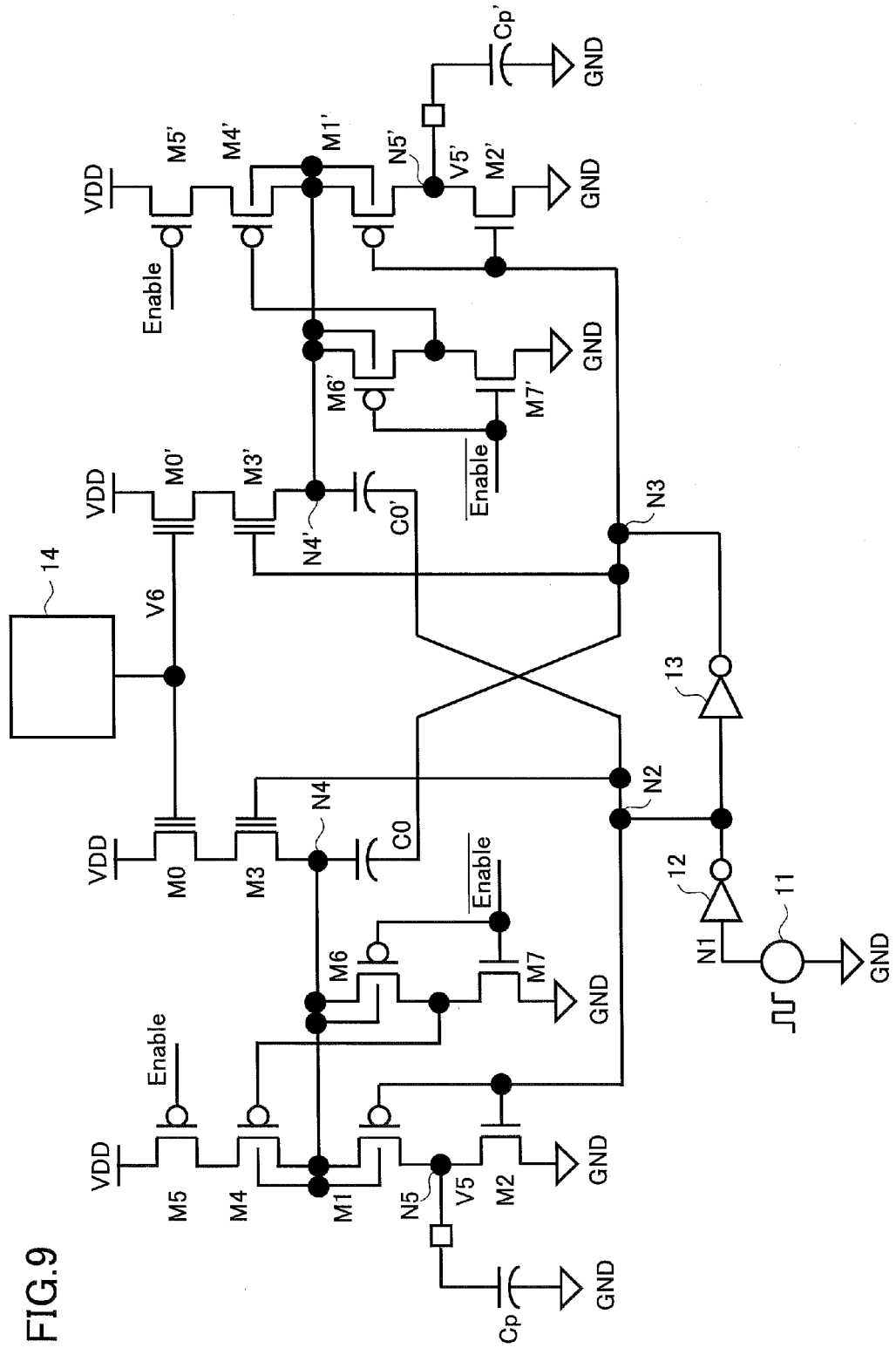
FIG. 9 is a diagram illustrating a configuration of the clock booster circuit according to the third embodiment.

FIG. 9 is a diagram illustrating a clock booster circuit 3D, which is a variation of the clock booster circuit 3C. Referring to FIG. 9, transistors M4, M5, M6, M7, M4', M5', M6', and M7' are added to the clock booster circuit 3C. The transistors M4, M5, M6, M7, M4', M5', M6', and M7' are a fixation circuit that fixes, in accordance with an enabling signal, the logics of the increased voltages V5 and V5' generated based on the voltages of the sampling capacitors C0 and C0'. This fixation circuit makes it possible to prevent the logics of the increased voltages V5 and V5' from becoming unstable when a clock signal from the oscillator circuit 11 is not input.

Fourth Embodiment A

FIG. 10 is a diagram illustrating a configuration of a charge pump circuit 4A according to a fourth embodiment. The charge pump circuit 4A increases and outputs a voltage V11 of a clock signal of GND-VDD amplitude fed from the oscillator circuit 11. The charge pump circuit 4A includes the sampling capacitors C0 and C0', the transistor M0 connected to the sampling capacitor C0, the transistor M0' connected to the sampling capacitor C0', and the reference voltage generator circuit 14. The reference voltage generator circuit 14 supplies the transistors M0 and M0' with the reference voltage V6, which causes a voltage increase rate relative to the supply voltage VDD to vary in accordance with the supply voltage VDD. The charge pump circuit 4A further includes the transistors M1 and M1' and the inverters 12 and 13 as other circuit elements for increasing the supply voltage VDD.

The reference voltage generator circuit 14 generates the reference voltage V6 for increasing the supply voltage VDD, and supplies the reference voltage V6 to the gates of the transistors M0 and M0', which are the control electrodes of the transistors M0 and M0'. The transistor M0 is a switch that is controlled in accordance with the reference voltage V6 supplied from the reference voltage generator circuit 14 to charge the sampling capacitor C0 with electric charge as desired. The transistor M0' is a switch that is controlled in accordance with the reference voltage V6 supplied from the reference voltage generator circuit 14 to charge the sampling capacitor C0' with electric charge as desired.

The transistor M0 is connected as a source follower to the sampling capacitor C0. The transistor M0' is connected as a source follower to the sampling capacitor C0'. The transistor M0 has a drain as a first main electrode and a source as a second main electrode. The drain is connected to the supply voltage VDD. The source is connected to the output side electrode of the sampling capacitor C0 on its one side via a node N14. The transistor M0' has a drain as a first main electrode and a source as a second main electrode. The drain is connected to the supply voltage VDD. The source is connected to the output side electrode of the sampling capacitor C0' on its one side via a node N15.

According to this circuit configuration, at a voltage increase time when a node N12 where the inverter 13 and the sampling capacitor C0 are connected becomes HIGH (high level), the transistor M0 automatically turns OFF, and at a voltage increase time when a node N13 where the inverter 13 and the sampling capacitor C0' are connected becomes HIGH, the transistor M0' automatically turns OFF.

Further, the drain of the transistor M1 and the gate of the transistor M1' are connected to the node N14, and the drain of the transistor M1' and the gate of the transistor M1 are connected to the node N15.

The charge pump circuit 4A operates in accordance with the clock timing illustrated in FIG. 11. When the node N12 is LOW (low level), a voltage V14 of the sampling capacitor C0 increases to the voltage V6a, which depends on the reference voltage V6 supplied from the reference voltage generator circuit 14, and electric charge is stored in the sampling capacitor C0. Likewise, when the node N13 is LOW, a voltage V15 of the sampling capacitor C0' increases to the voltage V6a, which depends on the reference voltage V6 supplied from the reference voltage generator circuit 14, and electric charge is stored in the sampling capacitor C0'. The voltage V6a is expressed by:

$$V6a = V6 - Vth, \quad (6)$$

where Vth is the gate threshold voltage of the transistor M0 or M0'.

Meanwhile, when the node N12 is HIGH (high level), the electrode voltage on the clock signal input side of the sampling capacitor C0 is changed from GND to VDD. Therefore, a voltage (increased voltage) V17 obtained by increasing the supply voltage VDD is output from the source of the transistor M1 whose drain is connected to the node N14 (that is, from a node N17 where the source of the transistor M1 and the source of the transistor M1' are connected). The voltage V17 is given by:

$$V17 = VDD + V6a \quad (7)$$
$$= VDD + V6 - Vth.$$

Likewise, when the node N13 is HIGH, the electrode voltage on the clock signal input side of the sampling capacitor C0' is changed from GND to VDD. Therefore, the voltage (increased voltage) V17 obtained by increasing the supply voltage VDD is output from the source of the transistor M1' whose drain is connected to the node N15 (that is, from the node N17 where the source of the transistor M1' and the source of the transistor M1 are connected).

Accordingly, in this embodiment as well, it is possible to reduce the voltage increase rate as the supply voltage VDD increases and to increase the voltage increase rate as the supply voltage VDD decreases. Therefore, it is possible to widen a usable supply voltage VDD range.

Fourth Embodiment B

Figure 12:
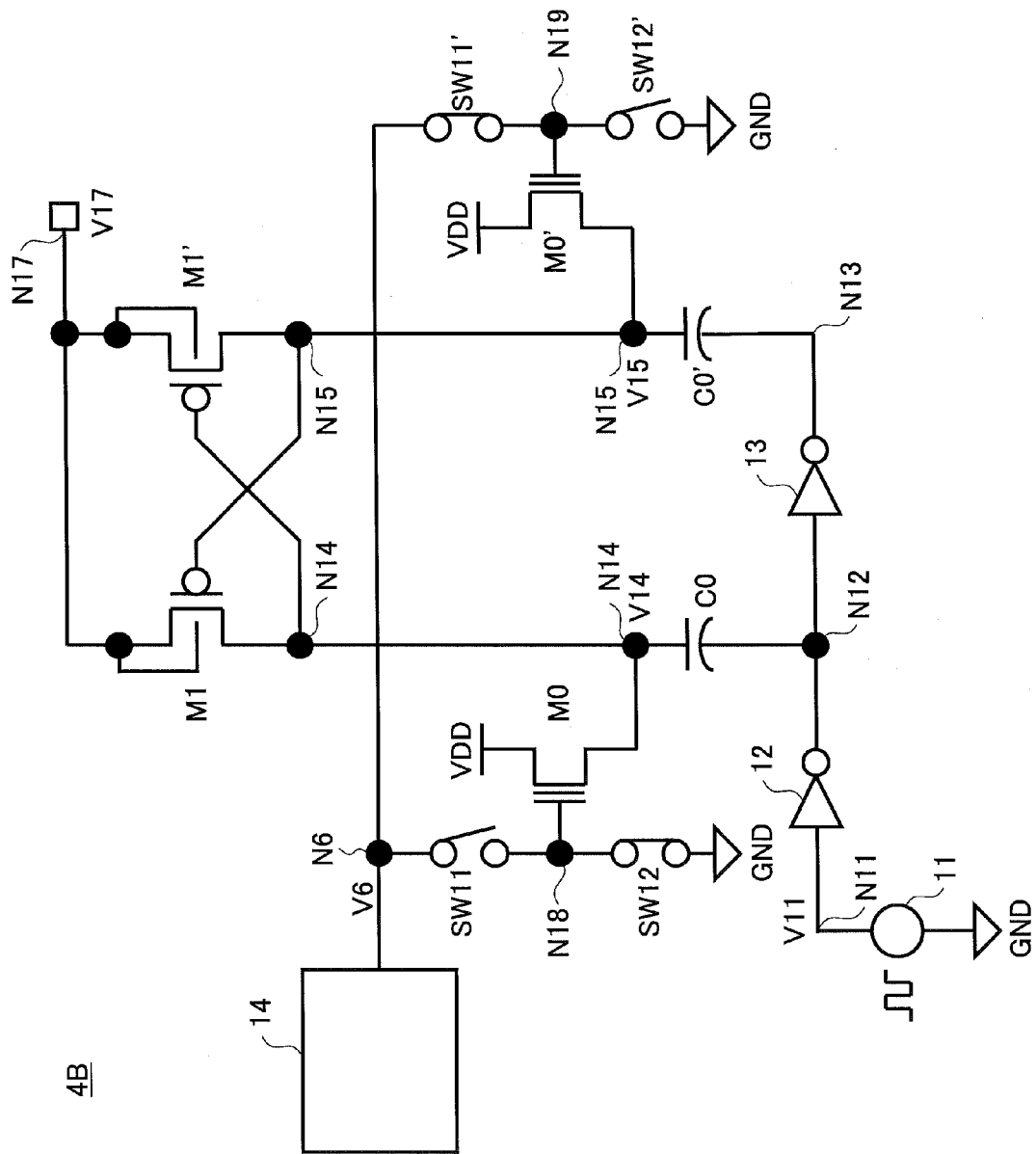
FIG. 12 is a diagram illustrating a configuration of the charge pump circuit according to the fourth embodiment.

FIG. 12 is a diagram illustrating a charge pump circuit 4B, which is a variation of the charge pump circuit 4A. Referring to FIG. 12, switches SW11, SW12, SW11', and SW12' are added to the charge pump circuit 4A. The switches SW11, SW12, SW11', and SW12' are a switch circuit that selectively switches a control voltage supplied to the gates of the transistors M0 and M0' to the reference voltage V6 or GND. The switches SW11, SW12, SW11', and SW12' turn ON and OFF in synchronization with a clock signal fed from the oscillator circuit 11. The switches SW11, SW12, SW11', and SW12' may be formed of, for example, a MOSFET.

It is preferable to adopt this configuration in the case of using native or depletion-mode N-channel MOSFETs for the transistors M0 and M0' under the condition that the reference voltage V6 is close to VDD potential. That is, when the reference voltage V6 is close to the supply voltage VDD, the gate-source voltage approaches 0 V. Therefore, if the transistors M0 and M0' are native or depletion-mode N-channel MOSFETs, the transistors M0 and M0' may not turn OFF. According to this configuration, it is possible to prevent generation of leakage paths from the nodes N14 and N15 to VDD. Thus, it is possible to avoid falling into a state where increasing voltage is impossible.

The charge pump circuit 4B operates in accordance with the clock timing of FIG. 11.

(A) When the node N11 is LOW (low level), the node N12 is HIGH (high level) and the node N13 is LOW.

When the switch SW11 is OFF and the switch SW12 is ON, GND is applied to a node N18 where the gate of the transistor M0 and the switches SW11 and SW12 are connected.

When the switch SW11' is ON and the switch SW12' is OFF, the reference voltage V6 is applied to a node N19 where the gate of the transistor M0' and the switches SW11' and SW12' are connected.

(V6−(Vth of M0')) is sampled with reference to GND by the capacitor C0'. As a result, the node N15 becomes (V6−(Vth of M0')).

The potential of the capacitor C0 is raised with reference to VDD to increase the voltage across the capacitor C0 and the transistor M0 turns OFF. As a result, the node N14 becomes (VDD+(V6−(Vth of M0))). Because the gate potential of the transistor M0 is GND, the gate-source voltage Vgs of the transistor M0 is at or below −VDD. Therefore, even when a native or depletion-mode N-channel MOSFET is used for the transistor M0, no leak current is generated.

The transistor M1 turns ON and the transistor M1' turns OFF, so that the voltage at the node N14 is output to the node N17 (HIGH: (VDD+(V6−(Vth of M0))).

(B) When the node N11 is HIGH (high level), the node N12 is LOW (low level) and the node N13 is HIGH.

When the switch SW11 is ON and the switch SW12 is OFF, the reference voltage V6 is applied to the node N18 where the gate of the transistor M0 and the switches SW11 and SW12 are connected.

When the switch SW11' is OFF and the switch SW12' is ON, GND is applied to the node N19 where the gate of the transistor M0' and the switches SW11' and SW12' are connected.

(V6−(Vth of M0)) is sampled with reference to GND by the capacitor C0. As a result, the node N14 becomes (V6−(Vth of M0)).

The potential of the capacitor C0' is raised with reference to VDD to increase the voltage across the capacitor C0' and the transistor M0' turns OFF. As a result, the node N15 becomes (VDD+(V6−(Vth of M0'))). Because the gate potential of the transistor M0' is GND, the gate-source voltage Vgs of the transistor M0' is at or below −VDD. Therefore, even when a native or depletion-mode N-channel MOSFET is used for the transistor M0', no leak current is generated.

The transistor M1 turns OFF and the transistor M1' turns ON, so that the voltage at the node N15 is output to the node N17 (HIGH: (VDD+(V6−(Vth of M0'))).

By repeating (A) and (B), the high-level portions of the clock signal voltage increased at the nodes N14 and N15 are combined and output from the node N17.

Fourth Embodiment C

Figure 13:
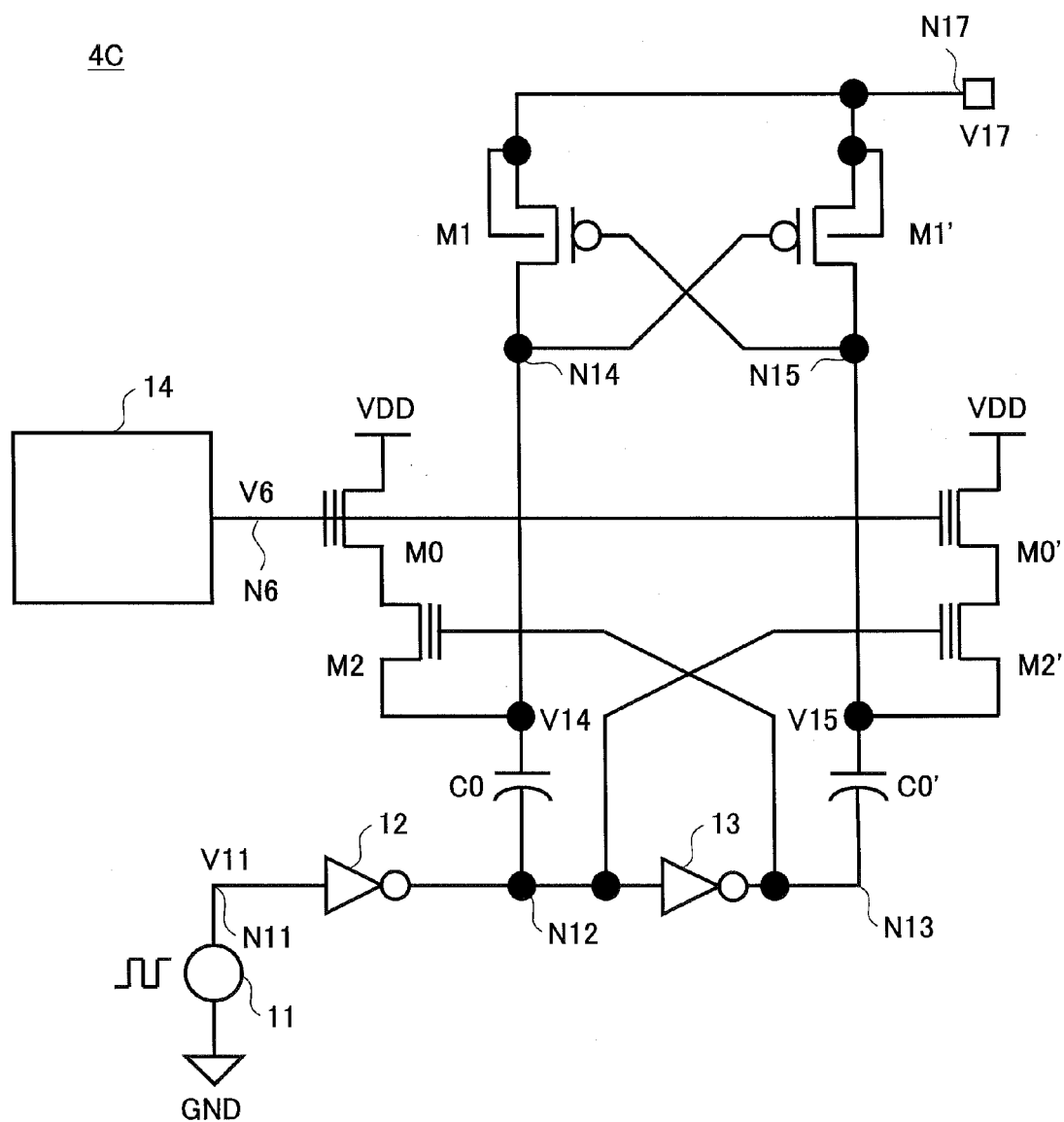
FIG. 13 is a diagram illustrating a configuration of the charge pump circuit according to the fourth embodiment.

FIG. 13 is a diagram illustrating a charge pump circuit 4C, which is a variation of the charge pump circuit 4A. Referring to FIG. 13, the transistors M2 and M2' are added to the charge pump circuit 4A. The charge pump circuit 4C includes the sampling capacitors C0 and C0', the transistors M0 and M0' that are connected to the sampling capacitors C0 and C0' via the transistors M2 and M2', respectively, and the reference voltage generator circuit 14.

The transistor M2 includes a gate connected to the node N13, which is connected to the output terminal of the inverter 13 and the electrode of the sampling capacitor C0' on its clock input side, a drain connected to the source of the transistor M0, and a source connected to the node N14. The transistor M2' includes a gate connected to the node N12, which is connected to the output terminal of the inverter 12 and the electrode of the sampling capacitor C0 on its clock input side, a drain connected to the source of the transistor M0', and a source connected to the node N15.

The charge pump circuit 4C operates in accordance with the clock timing of FIG. 11.

(A) When the node N11 is LOW (low level), the node N12 is HIGH (high level) and the node N13 is LOW.

(V6−(Vth of M0')) is sampled with reference to GND by the capacitor C0'. As a result, the node N15 becomes (V6−(Vth of M0')).

The potential of the capacitor C0 is raised with reference to VDD to increase the voltage across the capacitor C0 and the transistor M0 turns OFF. As a result, the node N14 becomes (VDD+(V6−(Vth of M0))). Because the transistor M2 is OFF, even when a native or depletion-mode N-channel MOSFET is used for the transistor M0, no leak current to VDD is generated.

The transistor M1 turns ON and the transistor M1' turns OFF, so that the voltage at the node N14 is output to the node N17 (HIGH: (VDD+(V6−(Vth of M0))).

(B) When the node N11 is HIGH (high level), the node N12 is LOW (low level) and the node N13 is HIGH.

(V6−(Vth of M0)) is sampled with reference to GND by the capacitor C0. As a result, the node N14 becomes (V6−(Vth of M0)).

The potential of the capacitor C0' is raised with reference to VDD to increase the voltage across the capacitor C0' and the transistor M0' turns OFF. As a result, the node N15 becomes (VDD+(V6−(Vth of M0'))). Because the transistor M2' is OFF, even when a native or depletion-mode N-channel MOSFET is used for the transistor M0', no leak current to VDD is generated.

The transistor M1 turns OFF and the transistor M1' turns ON, so that the voltage at the node N15 is output to the node N17 (HIGH: (VDD+(V6−(Vth of M0'))).

By repeating (A) and (B), the high-level portions of the clock signal voltage increased at the nodes N14 and N15 are combined and output from the node N17.

Fourth Embodiment D

Figure 14:
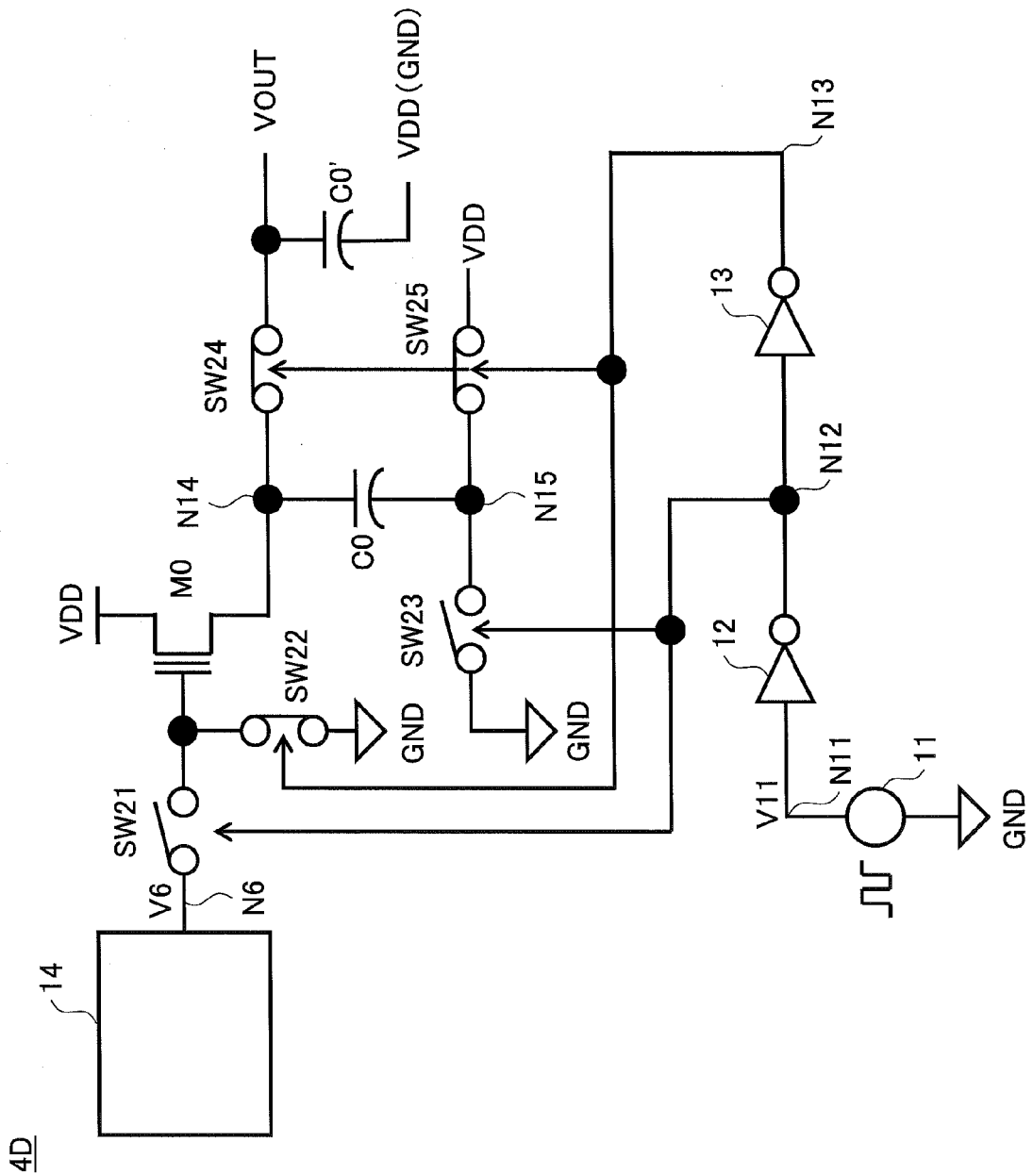
FIG. 14 is a diagram illustrating a configuration of the charge pump circuit according to the fourth embodiment.

FIG. 14 is a diagram illustrating a configuration of a charge pump circuit 4D. Referring to FIG. 14, switches SW21 and SW22 are a switch circuit that selectively switches a control voltage supplied to the gates of the transistors M0 and M0' to the reference voltage V6 or GND. A switch SW23 is a switch circuit that performs switching between enabling the sampling capacitor C0 to perform sampling and disabling the sampling capacitor C0 from performing sampling. Switches SW24 and SW25 are a switch circuit that performs switching between enabling the sampling capacitor C0 to output and disabling the sampling capacitor C0 from outputting. The switches SW21, SW22, SW23, SW24, and SW25 turn ON and OFF in synchronization with a clock signal fed from the oscillator circuit 11. The switches SW21, SW22, SW23, SW24, and SW25 may be formed of, for example, a MOSFET.

The charge pump circuit 4D operates in accordance with the clock timing of FIG. 11.

(A) When the node N11 is LOW (low level), the node N12 is HIGH (high level) and the node N13 is LOW.

When the switch SW21 turns ON, the switch SW22 turns OFF, and the switch SW23 turns ON, the reference voltage V6 is applied to the gate of the transistor M0, so that (V6−(Vth of M0)) is sampled with reference to GND by the capacitor C0.

When the switch SW24 is OFF and the switch SW25 is OFF, a voltage held by the capacitor C0' is output to an output VOUT.

(B) When the node N11 is HIGH (high level), the node N12 is LOW (low level) and the node N13 is HIGH.

When the switch SW21 is OFF, the switch SW22 is ON, and the switch SW23 is OFF, the transistor M0 turns OFF and the capacitor C0 is cut off from a sampling path.

When the switch SW24 is ON and the switch SW25 is ON, the potential of the capacitor C0 is raised with reference to VDD, so that the potential of the node N14 becomes (V6−(Vth of M0)). The node N14 is connected to the output VOUT to cause the electric charge of the capacitor C0 to be transferred to the capacitor C0'.

By repeating (A) and (B), the voltage increased in the capacitor C0 is transferred to the capacitor C0', and the increased voltage is output from VOUT.

Fifth Embodiment

Configuration of Reference Voltage Generator Circuit 14

Figure 15:
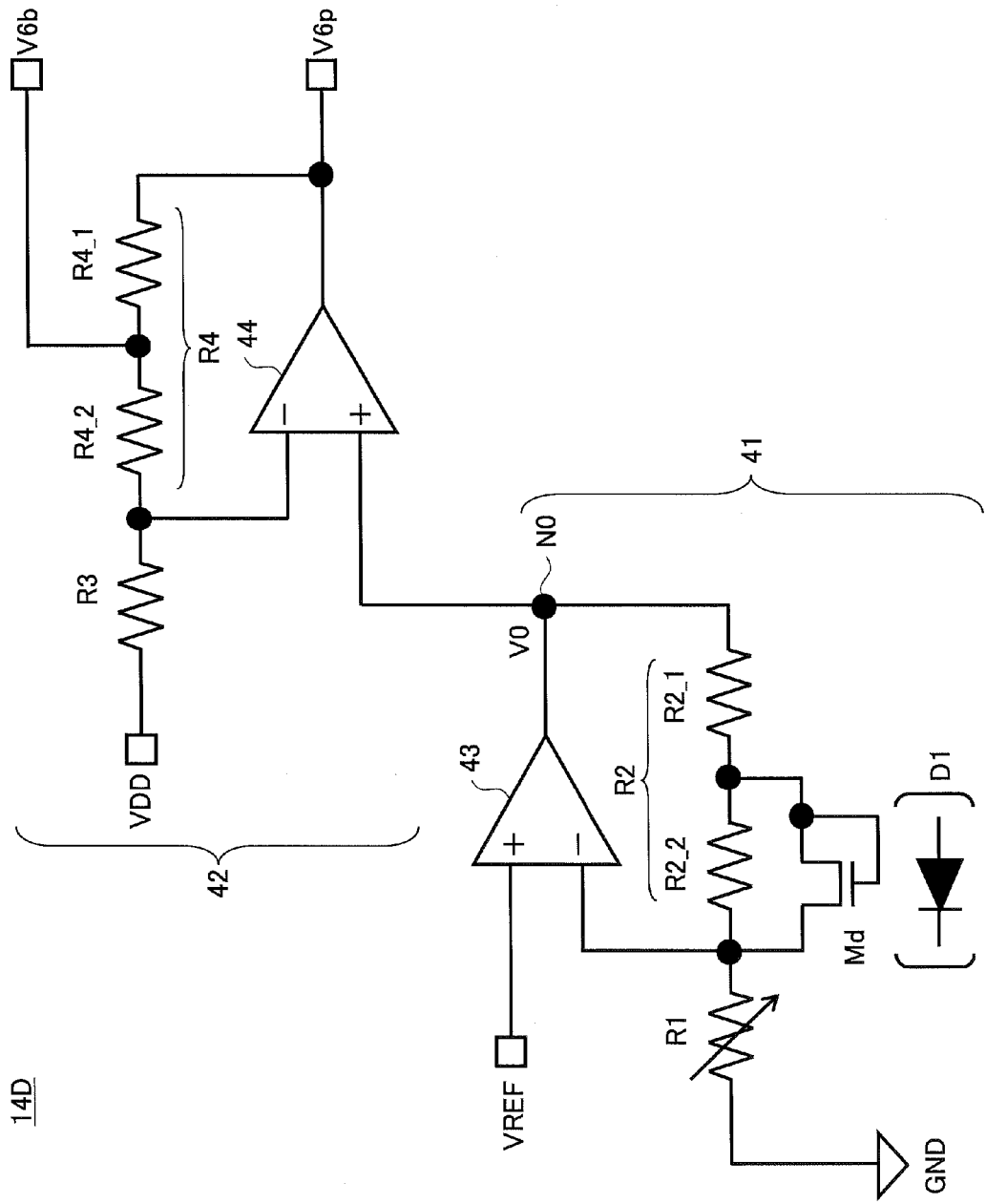
FIG. 15 is a diagram illustrating a configuration of a configuration of the reference voltage generator circuit according to a fifth embodiment.
Figure 16:
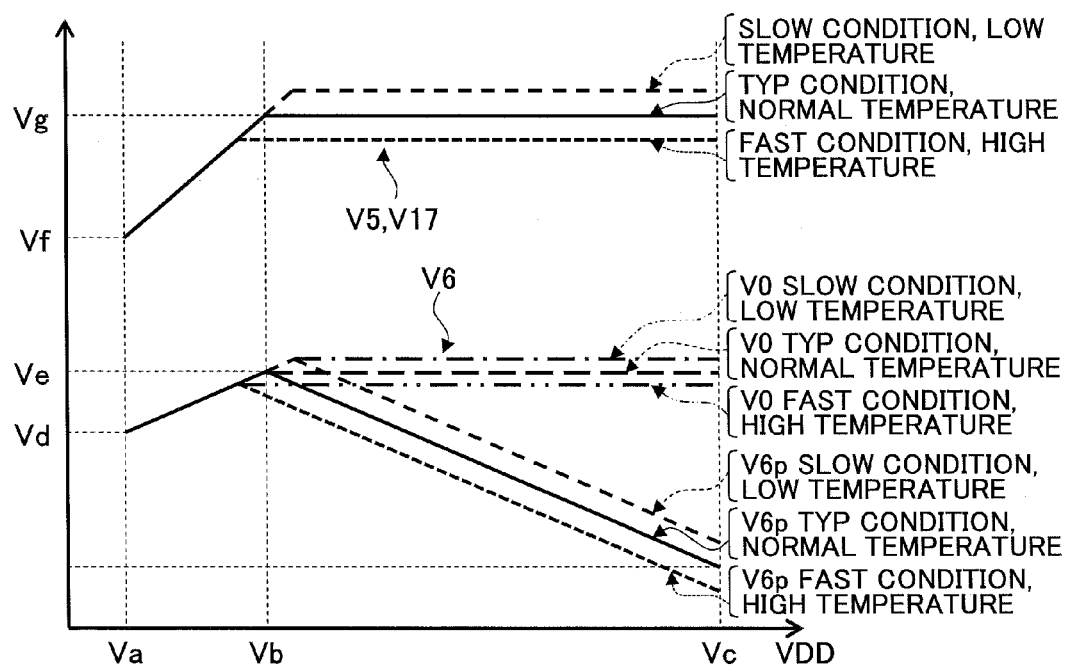
FIG. 16 is a graph illustrating variations of the reference voltage and increased voltages relative to the supply voltage according to the fifth embodiment.

FIG. 15 is a diagram illustrating a configuration of the reference voltage generator circuit 14, which is configured to generate the reference voltage V6 that causes the voltage increase rate to vary in accordance with the supply voltage VDD. According to a reference voltage generator circuit 14D of FIG. 15, it is possible to generate the reference voltage V6 that varies as illustrated in FIG. 16. Further, according to this reference voltage generator circuit 14D, it is possible to limit the increased voltages V5 and V17 to lower than or equal to a predetermined upper limit value (for example, an upper limit value Vg determined in accordance with the withstand voltage of a semiconductor process) when the supply voltage VDD is higher than a predetermined value Vb as illustrated in FIG. 16.

The reference voltage generator circuit 14D includes a non-inverting amplifier circuit 41 and an inverting amplifier circuit 42 that generates the reference voltage V6 based on an output voltage V0 of the non-inverting amplifier circuit 41 (in FIG. 15, a voltage V6p and a voltage V6b are illustrated as examples of the reference voltage V6).

The voltage V6p is expressed by:

$$V6p = V0 - (VDD - V0) \cdot ((R4\_1 + R4\_2)/R3). \quad (8)$$

By causing Resistor R3:(Resistor R4_1+Resistor R4_2) to be 1:1, it is possible to cause the amplification factor of the inverting amplifier circuit 42 to be −1.

Meanwhile, the voltage V0 is expressed by:

$$V0 = (R1 + R2\_1 + R2\_2)/(R2\_1 + R2\_2) \cdot VREF. \quad (9)$$

That is, in order to perform amplification of a gain of −1 on the supply voltage VDD in Vb≤VDD≤Vc of FIG. 16, an inverting amplifier circuit of a gain of −1 may be used with VDD being an inverting input signal. Further, in order to equalize the input voltage and the output voltage of an operational amplifier 44 when VDD=Vb, the reference voltage of the inverting amplifier circuit (the non-inverting input terminal) may be set to Vb. Meanwhile, in Va≤VDD<Vb of FIG. 16, the voltage VREF, the resistances of the resistors R1, R2_1, and R2_2 may be determined, using the incapability of an operational amplifier 43 to output a voltage higher than the supply voltage VDD, so that the output voltage V0 equal to the supply voltage VDD may be generated. For example, in the case of setting Vb to 2.1 V, the voltage VREF, which is a constant voltage lower than the supply voltage VDD, may be set to 1.2 V, and R1: (R2_1+R2_2) may be set to 12:9.

Making Resistor R1 Variable Resistor

It is possible to control the shift of the increased voltage due to process variations by making the resistor R1 a variable resistor (trimming resistors with a switch, etc.). When the increased voltage becomes too high, the voltage V0 at the node N0 to which the output terminal of the operational amplifier 43 is connected is caused to decrease by increasing the resistance of the resistor R1, thereby reducing the voltages V6p and V6b as well. On the other hand, when the increased voltage is too low, the voltage V0 at the node N0 is caused to increase by reducing the resistance of the resistor R1, thereby increasing the voltages V6p and V6b as well.

Figure 17:
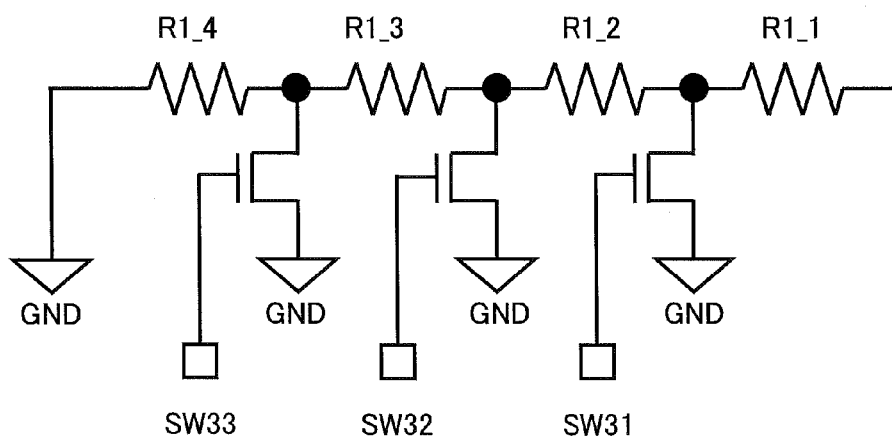
FIG. 17 is a diagram illustrating a configuration of a variable resistor according to the fifth embodiment.

For example, as illustrated in FIG. 17, the variable resistor R1 may be composed of multiple resistor elements. The resistance of the variable resistor R1 may be adjusted by turning ON or OFF switches SW31, SW32, and SW 33 based on data prestored in correlation with corresponding values of the supply voltage VDD in a nonvolatile memory.

Thus, it is possible to simultaneously ensure product reliability (a product service life) due to the absence of an excessive increase in voltage and prevent the degradation of characteristics due to an insufficient increase in voltage.

Dividing Resistor R2 into Resistor R2_1 and Resistor R2_2

In FIG. 15, a resistor R2 is divided into the resistors R2_1 and R2_2, and a diode-connected MOSFET Md is connected in parallel to one of the resistors R2_1 and R2_2. The diode-connected MOSFET Md may be replaced with a diode or a diode-connected NPN or PNP transistor.

Figure 18:
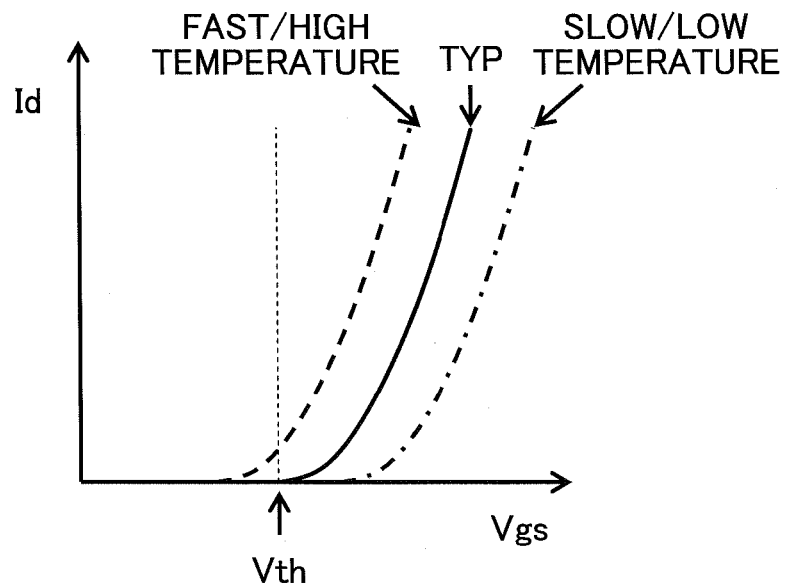
FIG. 18 is a graph illustrating the Vgs-Id characteristic of a MOSFET according to the fifth embodiment.

In general, the electric current equation of the MOSFET is, in a saturation region, given by:

$$Id = (\mu Cox)/2 \cdot W/L \cdot (Vgs - Vth)^2. \quad (10) \text{ (See FIG. 18.)}$$

Figure 19:
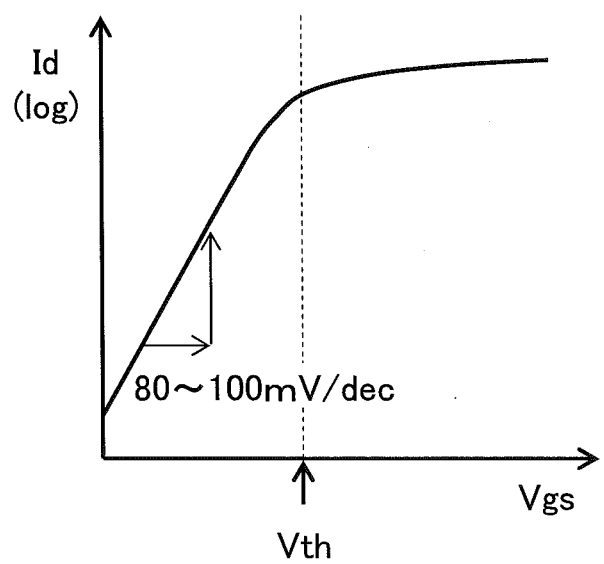
FIG. 19 is a graph illustrating the Vgs-Id characteristic of a MOSFET (with the vertical axis in log scale) according to the fifth embodiment.

When Vgs<Vth, the current Id varies between 80 mV/dec and 100 mV/dec. (See FIG. 19.) Using this characteristic, it is possible to cause the increased voltage to vary by making a bypass current path by connecting the diode-connected MOSFET Md to the resistor R2_2.

A voltage VR1 across the resistor R1 is equal to the voltage VREF, and an electric current of IR1=VR1/R1 flows through the resistor R1. This electric current IR1 flows through the resistor R2_2 and the diode-connected MOSFET Md. The resistance of the resistor R2_2 is determined so that a voltage VR2_2 (=R2_2·IR1) generated across the resistor R2_2 is a value around the Vth of the diode-connected MOSFET Md with the diode-connected MOSFET Md being unconnected.

By way of example, a description is given below of the case where VR2_2<Vth and the diode-connected MOSFET Md is operating in a sub-threshold state (because the tendency is the same in the case of replacing the MOSFET Md with a diode).

When the process corner shifts to the FAST side or Vth decreases in a high temperature state, for example, a Vth decrease of approximately 80 mV increases the amount of electric current tenfold with the voltage applied to a MOSFET being constant. Therefore, an electric current flowing through the resistor R2_2 starts to divert to the MOSFET Md, so that the voltage VR2_2 generated across the resistor R2_2 is reduced.

Further, when the process corner is a FAST and high temperature state and Vth decreases, for example, a Vth decrease of approximately 160 mV increases electric current hundredfold with the voltage applied to a MOSFET being constant. Therefore, more electric current flowing through the resistor R2_2 diverts to the MOSFET Md, so that the voltage VR2_2 generated across the resistor R2_2 is further reduced.

Meanwhile, when the process corner shifts to the SLOW side or Vth increases in a low temperature state, for example, a Vth increase of approximately 80 mV reduces electric current to one-tenth with the voltage applied to a MOSFET Md being constant. Therefore, electric current diverting to the MOSFET Md flows through the resistor R2_2, so that the voltage VR2_2 generated across the resistor R2_2 increases.

A description of the case where the corner condition is a SLOW and low temperature state is omitted.

A variation in the increased voltage may be corrected in the reference voltage generator circuit 14 depending on the influence of a process corner or a temperature characteristic using the above-described characteristics. This stabilizes the characteristics of a switch driven with the increased voltage, so that it is possible to stabilize a product and to improve the reliability of the product.

Thus, when the semiconductor process varies to the FAST corner condition or the Vth of a MOSFET decreases in a high temperature state, the voltage VR2_2 generated across the resistor R2_2 decreases by causing the electric current of the resistor R2_2 to divert to the MOSFET Md. As a result, the voltage V0 at the node N0 decreases, so that it is possible to reduce the voltages V6p and V6b. (See FIG. 16.) Thus, even when the increased voltage V5 or V17 is caused to rise by a decrease in the Vth of the transistors M0 and M0' that receive the voltage V6p or V6b under the FAST corner condition or a high temperature condition, the rise may be offset by reducing the voltage V6p or V6b.

On the other hand, when the semiconductor process varies to the SLOW corner condition or the Vth of a MOSFET increases in a low temperature state, the voltage VR2_2 generated across the resistor R2_2 increases by increasing the electric current of the resistor R2_2, which has been caused to divert to the MOSFET Md. As a result, the voltage V0 at the node N0 increases, so that it is possible to increase the voltages V6p and V6b. (See FIG. 16.) Thus, even when the increased voltage V5 or V17 is caused to decrease by an increase in the Vth of the transistors M0 and M0' that receive the voltage V6p or V6b under the SLOW corner condition or a low temperature condition, the decrease may be offset by increasing the voltage V6p or V6b.

Thus, it is possible to simultaneously ensure product reliability (a product service life) due to the absence of an excessive increase in voltage and prevent the degradation of characteristics due to an insufficient increase in voltage.

Dividing Resistor R4 into Resistor R4_1 and Resistor R4_2

A resistor R4 may be divided into the resistors R4_1 and R4_2, and the output voltage V6p of the operational amplifier 44 may be used for the reference voltage V6 of a charge pump circuit and the output of a node between the resistors R4_1 and R4_2 may be used for the reference voltage V6 of a clock booster circuit.

The clock booster circuit is used in the case of supplying the increased voltage to a switch to which a clock signal is constantly input for ON-OFF switching, and the charge pump circuit is used in the case of supplying the increased voltage to a switch whose ON-OFF switching is intermittent. That is, the step-up circuit may be used according to different purposes of use. If a clock signal is not fed to the clock booster circuit, the increased voltage decreases because of leak current, so that the ON/OFF state of the switch may not be maintained.

The charge pump circuit constantly increases voltage, and continues to supply the electric charge of the sampling capacitor C0 to the capacitor Cp of the switch (load) (where electric charge at the preceding clock instant remains). Therefore, at the time of increasing voltage twofold, it is possible to increase voltage to 2VDD.

On the other hand, according to the clock booster circuit, when storing electric charge in the sampling capacitor C0 and driving the capacitor Cp of the switch (load) (the initial electric charge=0), the electric charge is redistributed between the sampling capacitor C0 and the load capacitor Cp, so that an output voltage Vx at a twofold voltage increase setting time decreases.

$$VDD \times C0 = (Vx - VDD) \times C0 + Cp \times Vx \quad (11)$$

$$2 \times C0 \times VDD = (C0 + Cp) \times Vx$$

$$Vx = \left(\frac{2 \times C0}{C0 + Cp}\right) \times VDD$$

When the increased voltage lowers because of the distribution of electric charge, the supply voltage VDD may become higher than the increased voltage to prevent the switch, which is the object of driving of the step-up circuit, from turning OFF, so that leak current may be generated in the case where the supply voltage VDD is high.

Therefore, the charge pump circuit and the clock booster circuit may be simultaneously included in an integrated circuit (IC), and the voltage V6b, which is extracted from a node between the resistors R4_1 and R4_2, may be used as the reference voltage V6 of the clock booster circuit in order to equalize the maximum values of the increased voltage.

Figure 20:
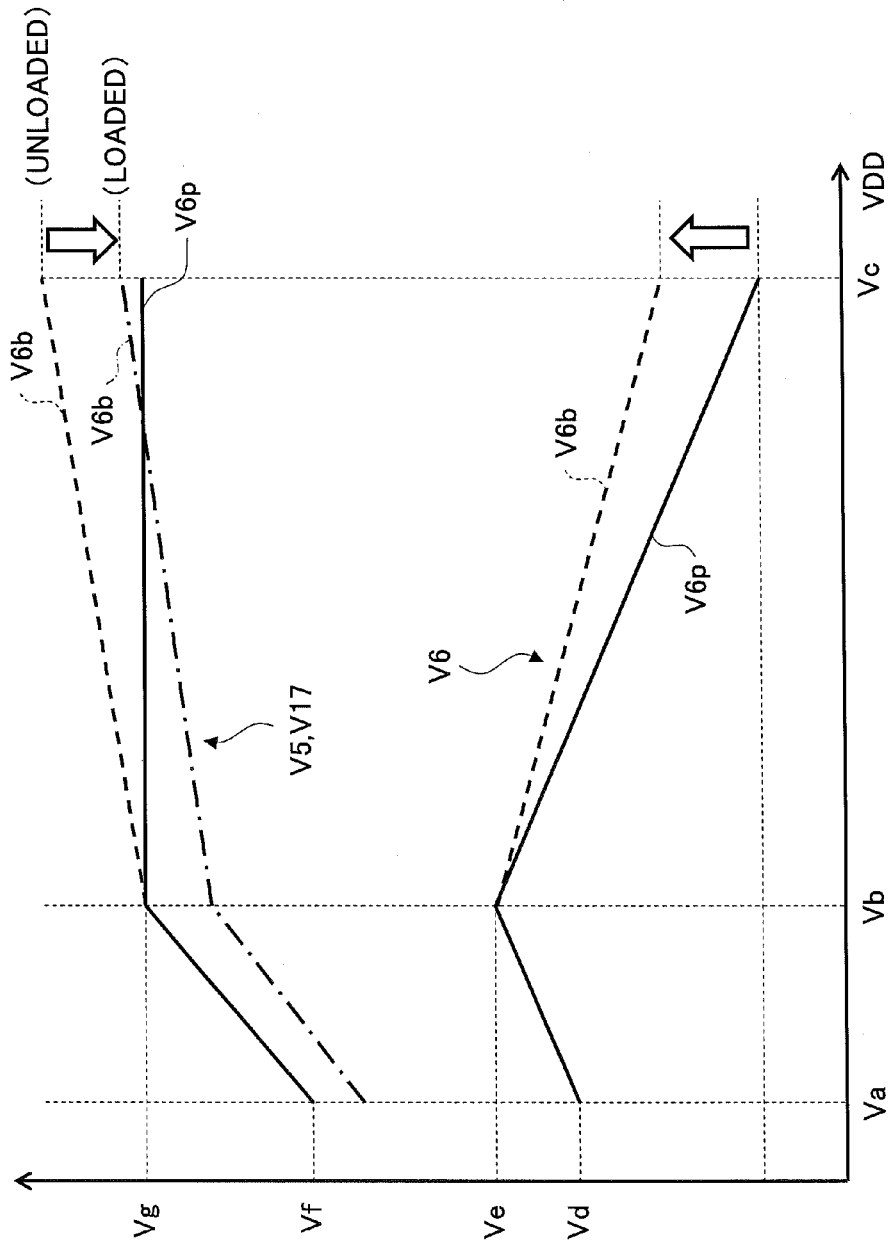
FIG. 20 is a graph illustrating variations of voltage according to the fifth embodiment.

The maximum values of the increased voltage may be equalized by causing the reference voltage for increasing voltage to rise as illustrated in FIG. 20 in expectation of a decrease in the output of the clock booster circuit due to the capacitance of the switch that serves as a load.

As a result, the charge pump circuit and the clock booster circuit may share a circuit that generates a reference voltage to be supplied to the charge pump circuit and the clock booster circuit, so that it is possible to reduce area and power consumption.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A step-up circuit, comprising:
    a capacitor;
    a transistor connected to the capacitor; and
    a reference voltage generator circuit configured to supply the transistor with a reference voltage that causes a rate of voltage increase relative to supply voltage to vary in accordance with the supply voltage, wherein the reference voltage generator circuit is configured to supply the transistor with the reference voltage so that the rate of voltage increase is lower in a first case than in a second case, wherein the supply voltage is higher in the first case than in the second case.

2. The step-up circuit as claimed in claim 1, wherein the reference voltage generator circuit is configured to supply the transistor with the reference voltage so that the rate of voltage increase is lower in the first case than in the second case, when the supply voltage is higher than a predetermined value.

3. The step-up circuit as claimed in claim 2, wherein the reference voltage generator circuit is configured to supply the transistor with the reference voltage so that the rate of voltage increase is higher in the first case than in the second case, when the supply voltage is lower than the predetermined value.

4. The step-up circuit as claimed in claim 2, wherein the reference voltage generator circuit is configured to limit an increased voltage obtained by increasing the supply voltage to lower than or equal to a predetermined upper limit value, when the supply voltage is higher than the predetermined value.

5. The step-up circuit as claimed in claim 1, wherein the reference voltage generator circuit is configured to correct an increased voltage obtained by increasing the supply voltage in accordance with temperature.

6. The step-up circuit as claimed in claim 1, wherein the reference voltage generator circuit includes
    a non-inverting amplifier circuit; and
    an inverting amplifier circuit configured to generate the reference voltage based on an output voltage of the non-inverting amplifier circuit.

* * * * *